United States Patent
Krounbi et al.

(10) Patent No.: US 7,379,269 B1
(45) Date of Patent: May 27, 2008

(54) WRITE ELEMENT WITH REDUCED YOKE LENGTH FOR ULTRA-HIGH DENSITY WRITING

(75) Inventors: Mohamad T. Krounbi, San Jose, CA (US); Li He, Fremont, CA (US); Ming Zhao, Fremont, CA (US); Yining Hu, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 302 days.

(21) Appl. No.: 10/903,140

(22) Filed: Jul. 30, 2004

(51) Int. Cl.
*G11B 5/147* (2006.01)
(52) U.S. Cl. .................................................. 360/126
(58) Field of Classification Search .................. 360/126
See application file for complete search history.

(56) References Cited

U.S. PATENT DOCUMENTS

| | | | |
|---|---|---|---|
| 5,652,687 A * | 7/1997 | Chen et al. ................ | 360/126 |
| 6,104,576 A * | 8/2000 | Santini ........................ | 360/126 |
| 6,111,724 A * | 8/2000 | Santini ........................ | 360/126 |
| 6,130,805 A | 10/2000 | Sasaki et al. | |
| 6,134,080 A * | 10/2000 | Chang et al. ................ | 360/126 |
| 6,181,514 B1 * | 1/2001 | Santini et al. .............. | 360/126 |
| 6,330,127 B1 * | 12/2001 | Sasaki ........................ | 360/126 |
| 6,466,401 B1 | 10/2002 | Hong et al. | |
| 6,490,125 B1 | 12/2002 | Barr | |
| 6,588,091 B1 | 7/2003 | Chang et al. | |
| 6,633,453 B1 | 10/2003 | Parker | |
| 6,696,226 B1 * | 2/2004 | Dinan et al. ................ | 430/320 |
| 6,754,947 B2 | 6/2004 | Stageberg et al. | |
| 6,757,134 B2 * | 6/2004 | Emilio Santini ............ | 360/126 |
| 6,859,343 B1 * | 2/2005 | Alfoqaha et al. ........... | 360/126 |
| 6,956,716 B2 * | 10/2005 | Lille ........................... | 360/126 |
| 6,999,277 B2 * | 2/2006 | Fontana et al. ............. | 360/126 |
| 7,012,784 B2 | 3/2006 | Sasaki et al. | |
| 7,187,519 B2 * | 3/2007 | Stageberg et al. .......... | 360/126 |
| 2002/0024776 A1 | 2/2002 | Sasaki et al. | |
| 2003/0021064 A1 | 1/2003 | Ohtomo et al. | |
| 2003/0021065 A1 | 1/2003 | Yamada et al. | |
| 2004/0080869 A1 | 4/2004 | Thompson Rea et al. | |

OTHER PUBLICATIONS

Restriction dated Nov. 14, 2006 from U.S. Appl. No. 10/909,226, 6 pages.
Office Action dated Mar. 22, 2007 from U.S. Appl. No. 10/909,226, 11 pages.
Office Action dated Apr. 5, 2006 from U.S. Appl. No. 10/909,224, 20 pages.

(Continued)

*Primary Examiner*—Angel Castro
(74) *Attorney, Agent, or Firm*—Johnathan E. Prejean, Esq.; Carr & Ferrell LLP

(57) ABSTRACT

A head including a write element for writing data to a magnetic media, and methods for its production are provided. A write element of the invention includes one or more of a recessed first pole, a heat sink layer, and a shortened yoke length. A method of the invention provides forming an anti-reflective layer before forming a mask layer. During photolithography the anti-reflective layer suppresses undesirable reflections off of features, such as vertical sidewalls, that otherwise limit how closely to such features portions of the mask layer can be formed.

20 Claims, 12 Drawing Sheets

OTHER PUBLICATIONS

Office Action dated Nov. 16, 2006 from U.S. Appl. No. 10/909,224, 5 pages.
Notice of Allowance dated Mar. 8, 2007 from U.S. Appl. No. 10/909,224, 4 pages.
Notice of Allowance dated May 17, 2007 from U.S. Appl. No. 10/909,224, 6 pages.
Wolf, et al., Silicon Processing for the VLSI Era, 1986, Lattice Press, vol. 1, pp. 335, 540-541.
Wolf, Silicon Processing for VLSI Era, 2002, Lattice Press, vol. 4, pp. 244-245, 249, 740-741.
Office Action dated Jan. 28, 2008 form U.S. Appl. No. 10/909,226, 19 pages.

* cited by examiner

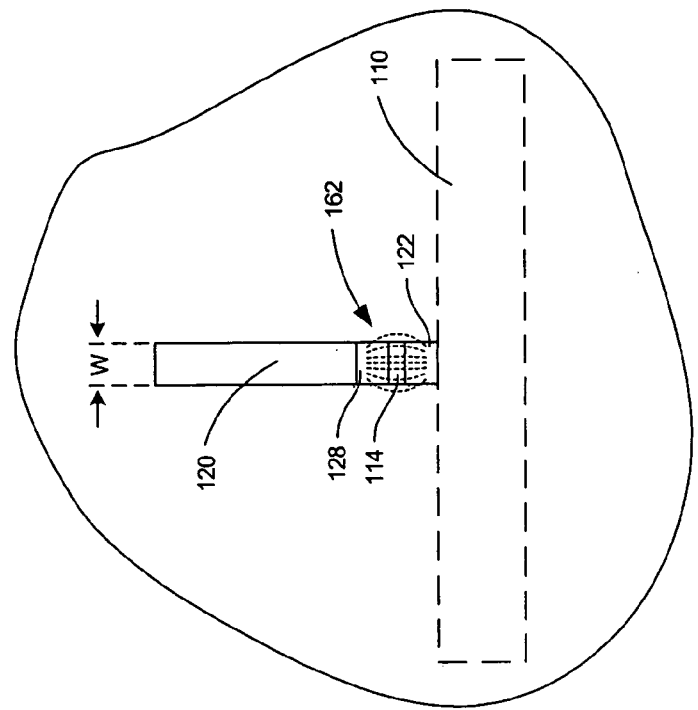
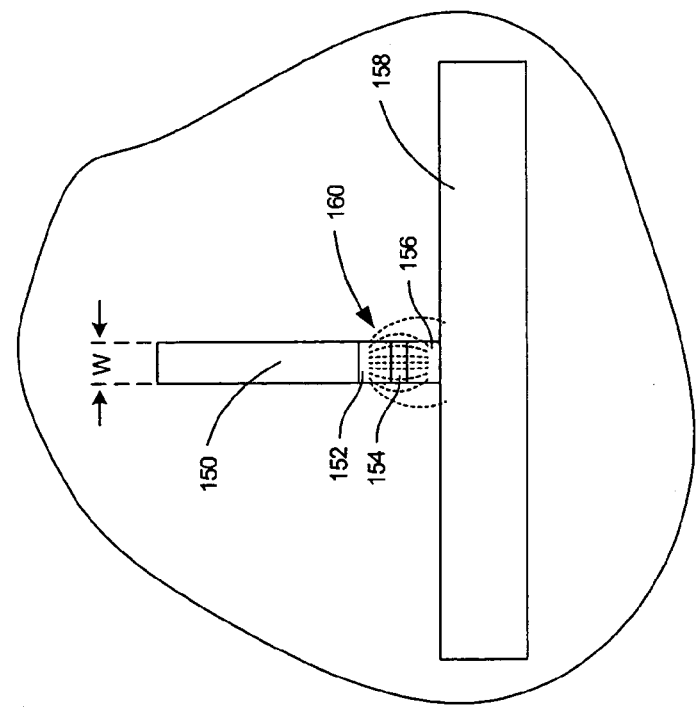
FIG. 5
FIG. 4
(Prior Art)

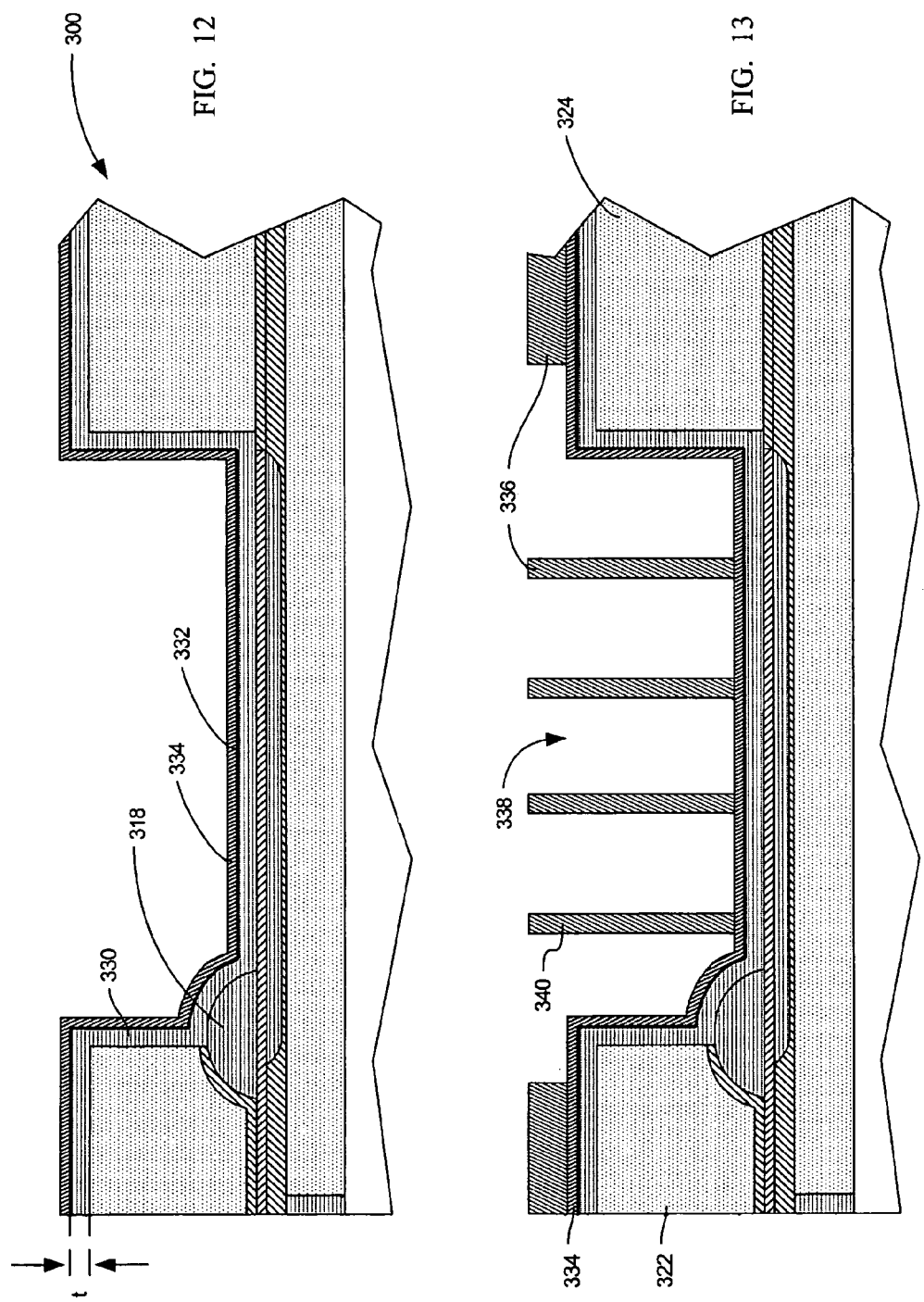

WRITE ELEMENT WITH REDUCED YOKE LENGTH FOR ULTRA-HIGH DENSITY WRITING

CROSS-REFERENCE TO RELATED APPLICATIONS

This application is related to U.S. patent application Ser. No. 10/909,226 entitled "Write Element with Recessed Pole and Heat Sink Layer for Ultra-High Density Writing", and to U.S. patent application Ser. No. 10/909,224 entitled "Method of Fabricating a Write Element with a Reduced Yoke Length", both filed on the same date herewith.

BACKGROUND OF THE INVENTION

1. Field of the Invention

The present invention relates generally to the field of magnetic disk drives, and more particularly to aspects of a write element of a disk drive head and methods of fabricating the same.

2. Description of the Prior Art

Magnetic disk drives are used to store and retrieve data for digital electronic apparatuses such as computers. In FIGS. 1 and 2, a magnetic disk data storage system 10 includes an enclosure 12, a disk drive motor 14, and a magnetic disk, or media, 16 supported for rotation by a drive spindle 17 of motor 14. Also included are an actuator 18 and an arm 20 attached to an actuator spindle 21 of actuator 18. A suspension 22 is coupled at one end to the arm 20 and at another end to a head 24. The suspension 22 and the head 24 are commonly collectively referred to as a head gimbal assembly (HGA). The head 24 typically includes a slider and a transducer that includes an inductive write element and a magnetoresistive read element. As the motor 14 rotates the magnetic disk 16, as indicated by the arrow R, an air bearing is formed under an air bearing surface (ABS) of the slider causing the head 24 to lift slightly off of the surface of the magnetic disk 16, or, as it is commonly termed in the art, to "fly" above the magnetic disk 16. Data bits can be written or read along a magnetic "track" of the magnetic disk 16 as the magnetic disk 16 rotates past the head 24. The actuator 18 moves the head 24 from one magnetic track to another by pivoting the arm 20 and the suspension 22 in an arc indicated by arrows P. The design of magnetic disk data storage system 10 is well known to those skilled in the art.

The magnetic disk data storage industry has been very successful at achieving ever greater data densities on magnetic disks 16. Increasing data densities, measured typically in gigabits per square inch $GB/in^2$, have been accomplished, in part, by writing increasingly narrower tracks and writing the tracks more closely together. Increasing data densities have also been achieved by writing more data bits in each track. This can be accomplished by increasing the frequency of the write element, where frequency is a measure of how many data bits the write element can write per second.

In order to continue to provide magnetic disk drives with still greater data densities, what is needed is a write element that is operable at still higher frequencies and that can write tracks more closely together.

SUMMARY

An embodiment of the invention provides a write element with a reduced yoke length. The write element comprises a bottom pole, a top pole, a P2 layer, a coil, and a zero throat insulation layer. The P2 layer is disposed between the bottom and top poles and includes a P2 pole and a P2 backgap providing magnetic communication between the bottom and top poles. The coil has turns disposed between the P2 pole and the P2 backgap, and the turns include a first turn insulated from the P2 pole by a first inorganic layer, and a last turn insulated from the P2 backgap by a second inorganic layer. The zero throat insulation layer is disposed between the bottom pole and the first inorganic layer.

In some embodiments the first and second inorganic layers are formed of $Al_2O_3$. The first and second inorganic layers can be portions of a coil insulation layer additionally disposed between the coil and the bottom pole. The first and second inorganic layers can each have a thickness of less than 1.0 μm, and in some embodiments the first and second inorganic layers each have a thickness in the range of 0.2 μm to 0.5 μm, or a thickness of about 0.2 μm.

In some further embodiments, the write element additionally comprises a write gap layer disposed between the P2 pole and the bottom pole. In some of these embodiments the write gap layer extends between the zero throat insulation layer and the bottom pole. The write element can also further comprise a bottom pole pedestal disposed between the P2 pole and the bottom pole. In some embodiments the bottom pole includes a recessed face.

The write element of the invention can also further comprise a heat sink layer disposed between the coil and the top pole. In some of these embodiments the heat sink layer including less than two turns in electrical communication with the coil, while in other embodiments the heat sink layer is electrically isolated from the coil. The heat sink layer is distinguishable from the coil, in some embodiments, by having an aspect ratio of 20 or more, and in other embodiments a ratio of a width of the heat sink layer to a width of the coil is at least 10. The write element of the invention can further comprise a P3 insulation layer between the top pole and the heat sink layer, and a coil insulation layer between the coil and the heat sink layer, wherein the heat sink layer is disposed within a volume defined between the P3 insulation layer and the coil insulation layer. In some of these embodiments the heat sink layer fills the volume.

The write element of the invention can further comprise a write gap layer disposed between the P2 pole and the bottom pole, a bottom pole pedestal disposed between bottom pole and the write gap layer and including a trailing edge, and a zero throat insulation layer disposed between the write gap layer and the top pole and including a leading edge. In some embodiments, the trailing edge of the bottom pole pedestal defines a zero throat height, in other embodiments the leading edge of the zero throat insulation layer defines the zero throat height, and in still other embodiments the leading edge of the zero throat insulation layer is aligned with the trailing edge of the bottom pole pedestal.

BRIEF DESCRIPTION OF DRAWINGS

FIG. 4 is a terminus surface view of a write element according to the prior art.

FIG. 5 is a terminus surface view of a write element according to an embodiment of the invention.

FIGS. 10-18 illustrate steps of an exemplary method for fabricating a write element according to an embodiment of the invention.

DETAILED DESCRIPTION

Embodiments of the invention provide write elements for writing data to magnetic media, and methods for their production. A write element of an embodiment of the invention can include one or more of the following improvements: a recessed first pole to minimize side writing; a heat sink layer to lessen pole tip protrusion; and a shortened yoke length made possible by reducing the spacing between the coil turns and the P2 pole and P2 backgap, but is not limited to only these improvements. The shortened yoke length shortens the over-all magnetic path around the yoke thereby increasing the frequency at which the write element can operate. An embodiment of the method of the invention provides techniques for fabricating write elements with reduced spacings between the coil turns and the P2 pole and P2 backgap.

Figure 1:
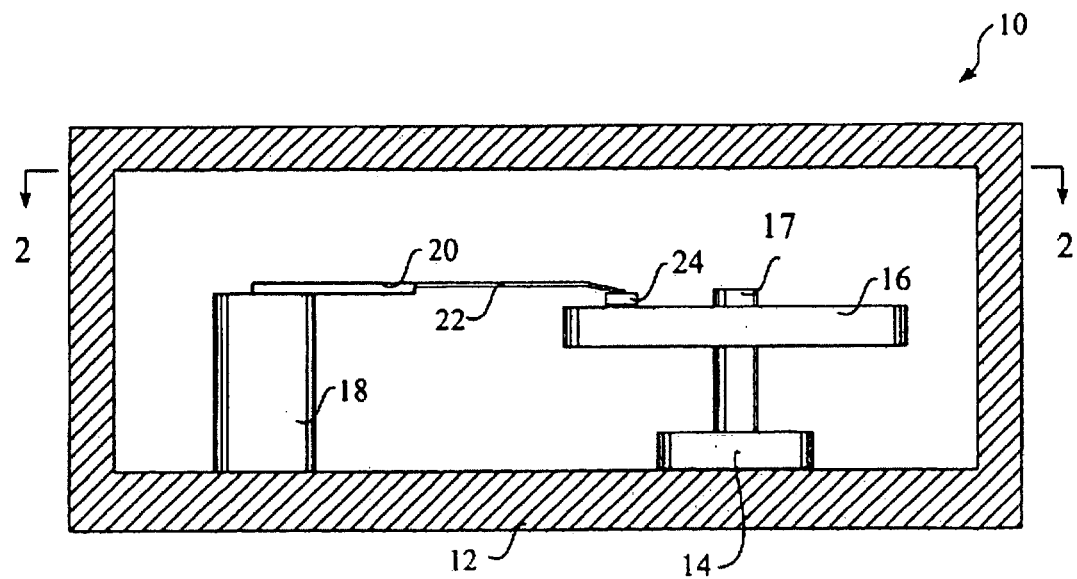
FIGS. 1 and 2 are side and top views of a magnetic disk data storage system according to the prior art.
Figure 2:
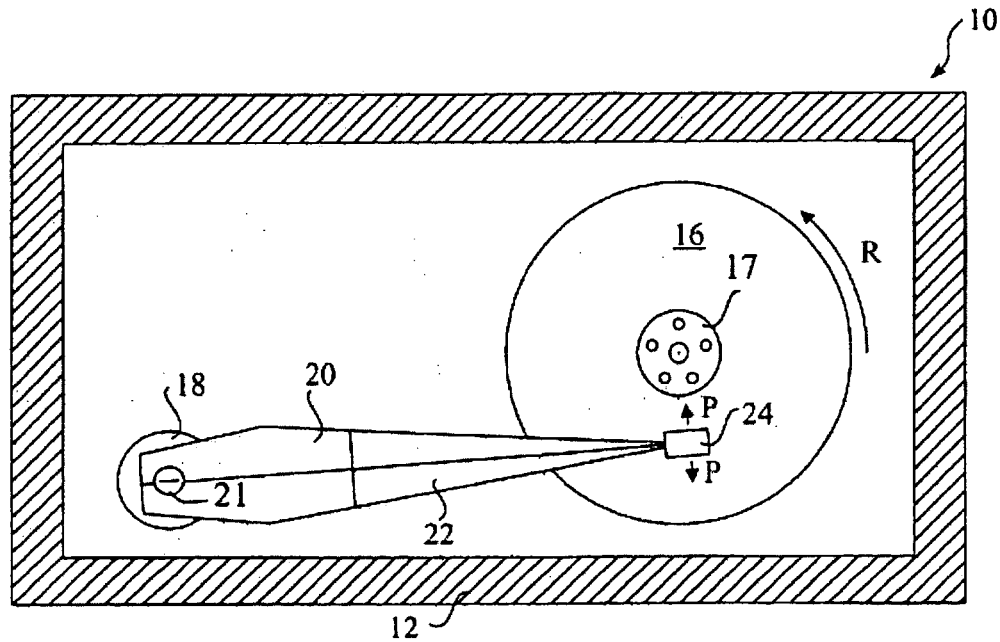
Figure 3:
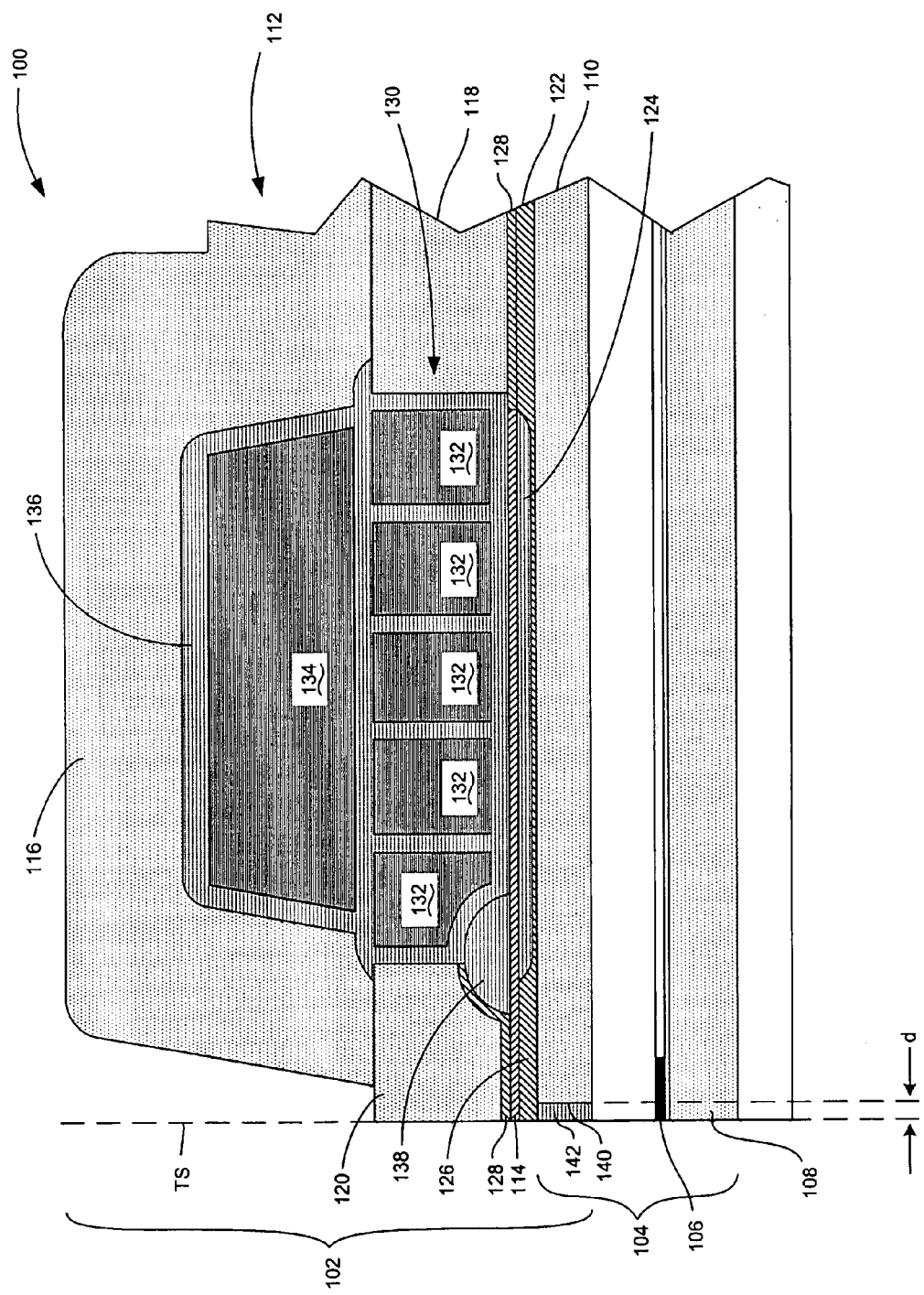
FIG. 3 is a cross-sectional view of an exemplary head according to an embodiment of the invention.

FIG. 3 shows a cross-sectional view of an exemplary transducer 100 of an embodiment of the invention which will be described generally before attention is turned to specific features that provide the improvements described herein. The transducer 100 comprises a write element 102 and a read element 104 that terminate at a terminus surface. The terminus surface extends from an air bearing surface (ABS) of a slider and can be either coplanar with the ABS or slightly offset therefrom, usually with a slight amount of recession. In some embodiments, the terminus surface is coated with a very thin protective coating (not shown) such as diamond-like or amorphous carbon. In a preferred embodiment, the read element 104 includes a magnetoresistive sensor 106 between two shields, a lower shield 108 and an upper shield that serves as a bottom pole 110 of the write element 102. The exemplary head 100 of FIG. 3 is typically referred to as a merged head because the bottom pole 110 functions as a component of both the write element 102 and the read element 104, however, in non-merged head embodiments the bottom pole of the write element 102 and the upper shield of the read element 104 are separate layers.

The write element 102 includes a yoke 112 which forms a ring having a narrow opening (a "write gap") that terminates at the terminus surface and that is filled by a write gap layer 114. The yoke 112 is preferably made from a high magnetic moment material that can support a magnetic field with a high flux density before becoming saturated (unable to support a higher flux density). In some embodiments, the yoke 112 is formed from the bottom pole 110, a top pole 116, a P2 backgap 118 that provides magnetic communication between the top and bottom poles 116, 110, and a P2 pole 120 magnetically connected to the top pole 116. The P2 pole 120 and P2 backgap 118 are so named because in some embodiments the two are patterned from the same layer, dubbed a P2 layer. In keeping with this alternative nomenclature, the bottom pole 110 is sometimes referred to as a P1 pole and the top pole 116 is sometimes referred to as a P3 pole.

The yoke 112 can optionally include one or more layers of a magnetic material with a higher magnetic moment than the materials used for the other components of yoke 112 (i.e., P1, P2, and P3 layers), as is well known in the art. A hot seed layer 122 is one such layer of the higher moment magnetic material. The hot seed layer 122 is formed between the bottom pole 110 and the write gap layer 114, and can extend to between the bottom pole 110 and the P2 backgap 118, as shown in FIG. 3. In some embodiments a portion of the hot seed layer 122 is removed and filled with a bottom pole insulation layer 124. The remaining portion of the hot seed layer 122 near the terminus surface forms a bottom pole pedestal 126. Another high moment layer 128 of a higher moment magnetic material can be formed between the P2 pole 120 and the write gap layer 114. In some embodiments the high moment layer 128 is also formed between the P2 backgap 118 and the bottom pole 110, as shown in FIG. 3.

A magnetic field is induced within the yoke 112 by passing an electric current through an electrically conductive coil 130 comprising multiple coil turns 132 that are spirally wound around the P2 backgap 118. A heat sink layer 134 helps to dissipate heat generated by the coil 130 during writing due to electrical resistance heating. The coil 130 and the heat sink layer 134 are electrically insulated from each other and from the top and bottom poles 116, 110 by insulation layers 136 that also serve to insulate the coil turns 132 from each other. An additional insulation layer, a zero throat insulation layer 138, is also disposed between the coil 130, the bottom pole 110, and the P2 pole 120, as shown in FIG. 3. The zero throat insulation layer 138 is discussed further with respect to FIG. 9.

Turning again to the bottom pole 110, it can be seen from FIG. 3 that the bottom pole 110 includes a terminus surface face 140 that is recessed from the terminus surface (TS) by a distance, d. The TS face 140 can be optionally covered by a TS insulation layer 142 formed, for example, of $Al_2O_3$. Recessing the TS face 140 of the bottom pole 110 from the terminus surface by distance, d, advantageously reduces a deleterious effect known as side writing, as described below with respect to FIGS. 4 and 5.

FIGS. 4 and 5 show, respectively, write elements of the prior art and an embodiment of the invention as viewed normal to the terminus surface. As can be seen in FIG. 4, the prior art write element has, terminating at the terminus surface, a P2 pole 150, a high moment layer 152, a write gap layer 154, a hot seed layer 156, and a bottom pole 158. When a magnetic field is induced in the yoke 112 (FIG. 3) lines of magnetic flux fringe outward around the write gap to form a write field 160 that can interact with a nearby magnetic disk (not shown) to write data bits thereon. While much of the write field 160 is constrained to extend between the high moment layer 152 and the hot seed layer 156, some lines of magnetic flux nevertheless connect to the top and bottom poles 150, 158. Lines of magnetic flux that connect to the top pole 150 have been omitted from FIGS. 4 and 5 for clarity.

It will be understood that the common width, W, of the P2 pole 150, the high moment layer 152, the write gap layer 154, and the hot seed layer 156 defines the width of the tracks that are written on the magnetic disk. Further, lines of flux that extend laterally beyond the width, W, and interact with the magnetic disk cause the effect known as side writing, which is essentially writing that is outside of the intended track. If tracks are spaced too closely together, side writing from one track will tend to partially overwrite adjacent tracks. Thus, side writing limits how closely tracks can be written to one another and therefore limits data density.

FIG. 5 depicts the reduction in side writing achieved by the recessed TS face 140 (FIG. 3) of an embodiment of the invention. The bottom pole 110 is shown in dashed lines in FIG. 5 to represent that it is recessed from the terminus surface by a distance, d (FIG. 3), and not exposed at the terminus surface. Recessing the bottom pole 110 reduces the number of lines of magnetic flux that extend laterally beyond the width, W. While recessing the bottom pole 110 reduces side writing, recessing the bottom pole 110 also reduces to a certain extent the amount of magnetic flux that is available within a write field 162. Accordingly, the distance, d, that the TS face 140 (FIG. 3) is recessed should be optimized to reduce side writing without overly reducing the magnetic flux within the write field 162. In some embodiments, the distance, d, is more than 0.02 μm and less than 1.0 μm. A preferable range for d is between about 0.1 μm and about 0.5 μm.

Figure 6:
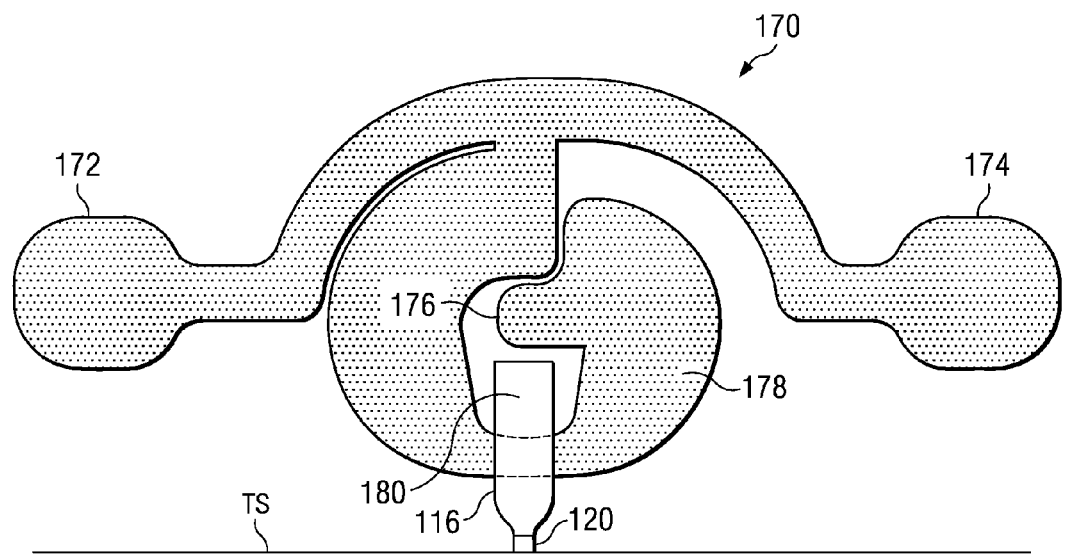
FIG. 6 is a top view of an exemplary heat sink layer according to an embodiment of the invention.

FIG. 6 shows a top view of an exemplary embodiment of a heat sink layer 170 in electrical communication with the coil 130 (FIG. 3; not shown in FIG. 6). For clarity, only the top pole 116, the P2 pole 120, and the terminus surface are illustrated. Heat sink layer 170 includes a first contact 172 and, in some embodiments, a second contact 174. In operation, often only one of the contacts 172, 174 is used, depending on which side of the magnetic disk the head is being used. Electricity follows a path between the operable contact 172 or 174 and a connecting portion 176 that makes an electrical contact to the coil 130 disposed in a layer below the heat sink layer 170. Between the operable contact 172 or 174 and the connecting portion 176 is a turn portion 178 of the heat sink layer 170 that passes beneath the top pole 116. Turn portion 178 makes essentially a complete turn around a backgap portion 180 of the top pole 116 beneath which the P2 backgap 118 (FIG. 3; not shown in FIG. 6) is situated.

As noted above, heat sink layer 170 conducts heat away from the coil 130 (FIG. 3) to lessen pole tip protrusion, as explained in more detail below with respect to FIG. 8. However, in the embodiment shown in FIG. 6, because the heat sink layer 170 is in a series electrical circuit with the coil 130 and forms a complete turn around the P2 backgap 118, the heat sink layer 170 also contributes to inducing a magnetic field in the yoke 112 (FIG. 3) when an electric current is passed therethrough. Although the turn portion 178 comprises essentially one turn around the backgap portion 180 of the top pole 116, if the contact 174 is the operable contact, then the heat sink layer 170 comprises more than one turn. It can be seen, however, that the heat sink layer 170 only passes once beneath the top pole 116, and therefore the heat sink layer 170 is limited to comprising less than two turns in this embodiment.

Figure 7:
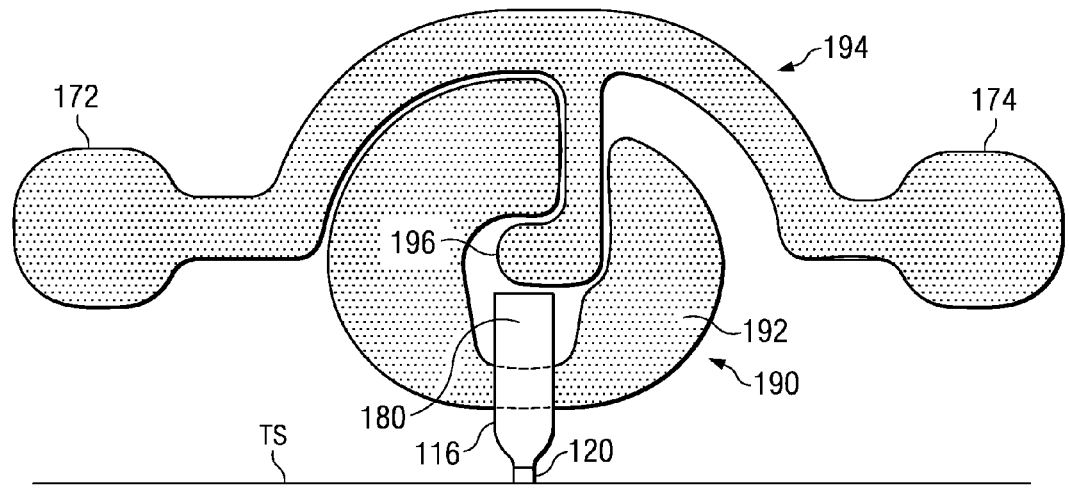
FIG. 7 is a top view of an exemplary heat sink layer according to another embodiment of the invention.

FIG. 7 shows a top view of another exemplary embodiment of a heat sink layer 190 that is electrically isolated from the coil 130 (FIG. 3; not shown in FIG. 7). As in FIG. 6, only the top pole 116, the P2 pole 120, and the terminus surface are additionally illustrated. Heat sink layer 190 comprises a turn portion 192 that passes beneath the top pole 116. Turn portion 192 makes nearly a complete turn around a backgap portion 180 of the top pole 116 beneath which the P2 backgap 118 (FIG. 3; not shown in FIG. 7) is situated. Although the heat sink layer 190 in this embodiment is not in electrical communication with the coil 130 and therefore does not contribute to inducing a magnetic field in the yoke 112 (FIG. 3), the turn portion 192 still preferably forms nearly a complete turn in order to cover the underlying coil 130 as nearly as possible for good heat conduction away from all portions of the coil 130.

Heat sink layer 190 is disposed adjacent to a conductor layer 194 that includes a first contact 172 and, in some embodiments, a second contact 174. As above, only one of the contacts 172, 174 is used, depending on which side of the magnetic disk the head is being used. Electricity follows a path between the operable contact 172 or 174 and a connecting portion 196 that makes an electrical contact to the coil 130 disposed beneath the heat sink layer 190.

Figure 19:
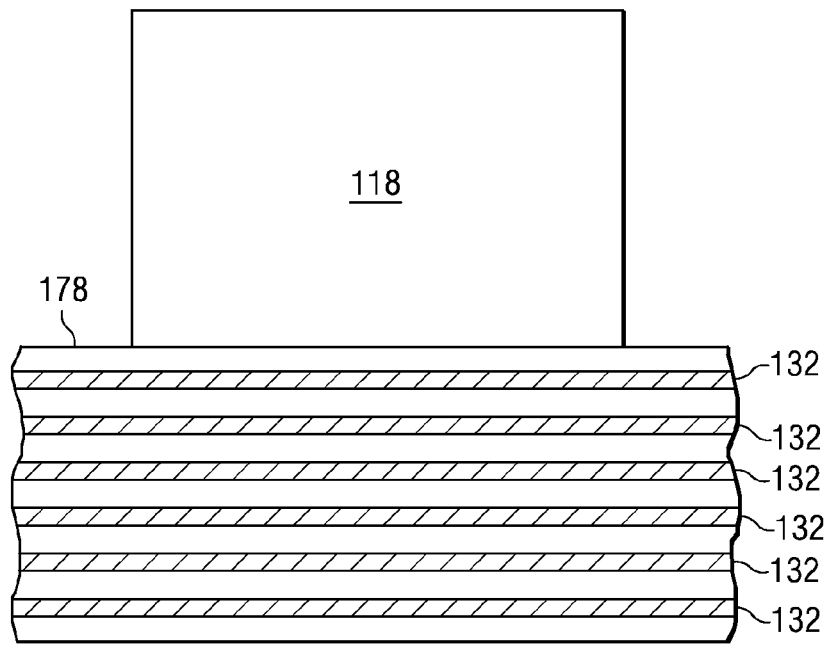
FIG. 19 shows a bottom view.
Figure 20:
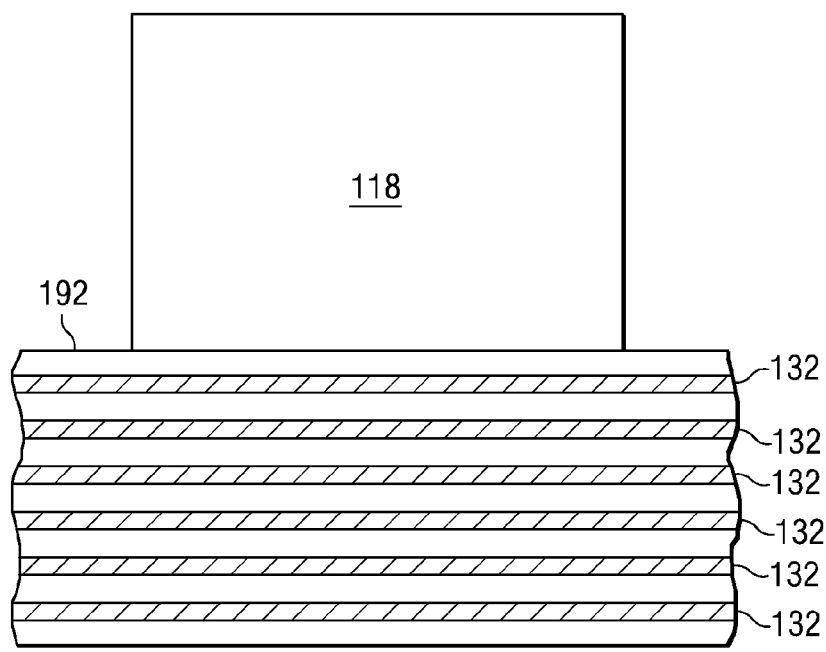
FIG. 20 shows a bottom view.

Differences exist between the heat sink layers 170 (FIG. 6) and 190 (FIG. 7) and the coil 130 (FIG. 3). As shown in FIGS. 19 and 20 the coil 130 comprises multiple coil turns 132 such that the coil 130 passes beneath the top pole 116 multiple times, whereas the heat sink layers 170, 190 pass beneath the top pole 116 only once. Although either heat sink layer 170, 190 could be replaced with a coil having multiple windings analogous to coil 130, doing so would require disposing an insulation layer between the multiple turns. In such a design, heat may not be dissipated as efficiently because some of the heat has to follow the spiral pattern of the coil.

Another distinction between the coil 130 and the heat sink layers 170, 190 is the aspect ratios thereof. In the coil 130, each coil turn 132 has a constant thickness (namely a thickness of the coil 130) but a potentially varying width. In some embodiments the width of each coil turn 132 narrows in the region beneath the top pole 116 so that a maximum number of coil turns 132 can pass therethrough. In some embodiments, for example, the thickness of the coil turns 132 is 1 μm and their widths vary from a minimum of about 0.5 μm to a maximum of about 2 μm. Thus, the aspect ratio of each coil turn 132, being the ratio of the width to the height of the coil turn 132, varies between about 0.5 to about 2.

By contrast, the heat sink layers 170, 190 increase this aspect ratio by widening the heat sink layers 170, 190 as much as is practical. Thus, in some embodiments, the width of the heat sink layer 170, 190 as measured under the top pole 116 and between the P2 pole 120 and the P2 backgap 118 is about 10 μm. In an embodiment in which the heat sink layer 170, 190 has a thickness of about 1 μm and a width measured under the top pole 116 of about 10 μm, a minimum aspect ratio is about 10. The remainder of the heat sink layer 170, 190 is considerably wider in this embodiment, and in some embodiments the width of the heat sink layer 170, 190 reaches a maximum of about 20 μm to about 30 μm or more. Thus, a ratio of the widths of the heat sink layer 170, 190 to that of a coil turn of the coil layer in the embodiments depicted in FIGS. 19 and 20, where both are measured under the top pole between the P2 pole and the P2 backgap, is more than 10, and in some embodiments the ratio is more than 60.

Figure 8:
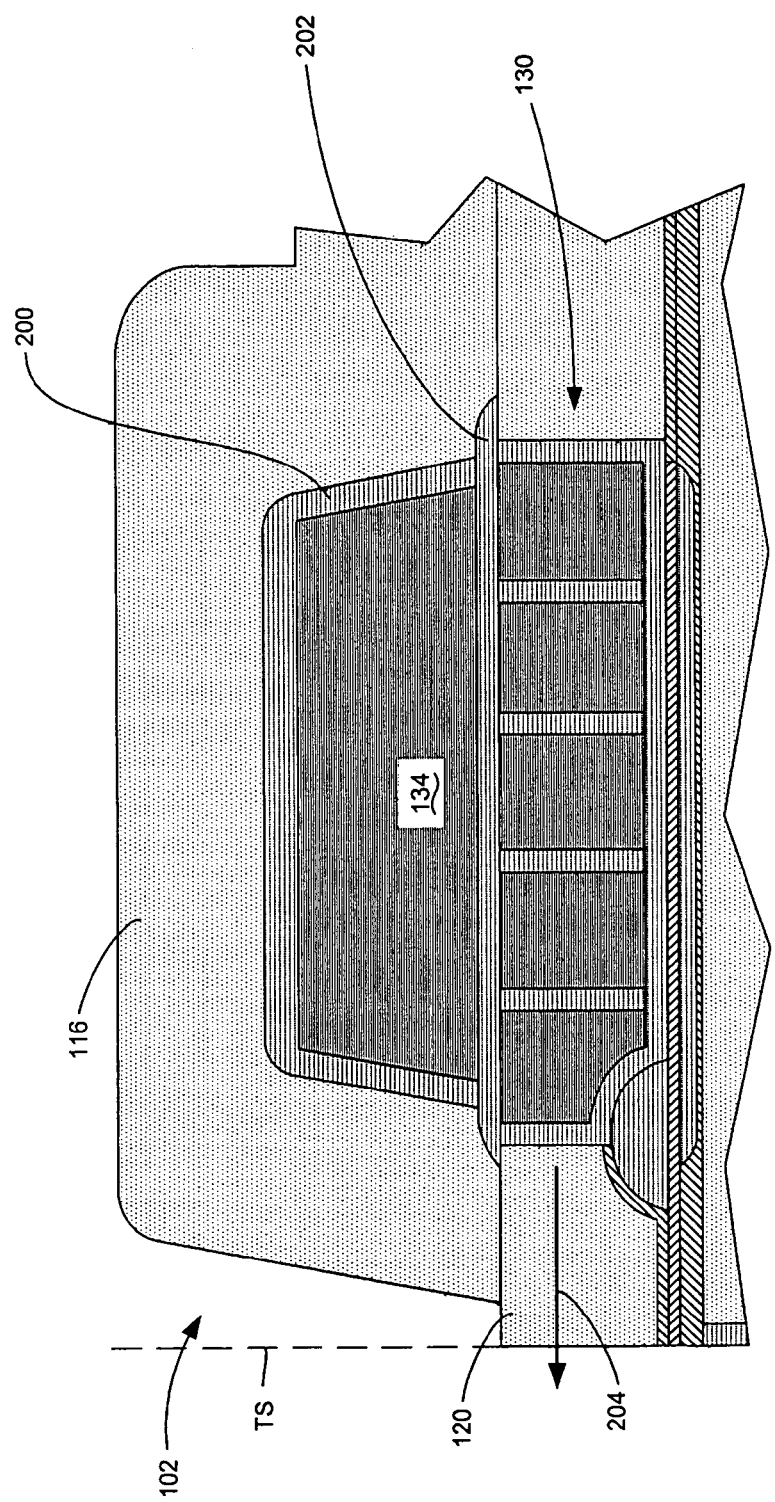
FIG. 8 is a cross-sectional view of a portion of an exemplary write element according to an embodiment of the invention.

FIG. 8 shows a portion of the write element 102 of FIG. 3 centered on the heat sink layer 134. The insulation layers 136 (FIG. 3) can be seen to include a P3 insulation layer 200 disposed between the top pole 116 and the heat sink layer 134, and an upper coil insulation layer 202 between the coil 130 and the heat sink layer 134. The heat sink layer 134 is disposed within a volume defined between the P3 insulation layer 200 and the upper coil insulation layer 202. In some embodiments, the heat sink layer 134 fills the volume, though in other embodiments the heat sink layer 134 only nearly fills the volume. Such embodiments can include, for example, additional insulation layers and/or seed layers.

As previously noted, the heat sink layer 134 serves to lessen pole tip protrusion. More specifically, as an electric current is passed through the coil 130 to induce a magnetic field in the yoke 112 (FIG. 3), the coil 130 generates heat that can cause the coil 130 to expand. This expansion produces a force 204 that causes the write element 102 to distort such that components like the P2 pole 120 protrude beyond the ABS. This pole tip protrusion is deleterious because it decreases the spacing between the head 100 (FIG. 3) and the adjacent magnetic disk (not shown) in the vicinity of the write element 102. This spacing loss can cause the head 100 to deleteriously contact the magnetic disk.

Accordingly, it is desirable to dissipate heat away from the coil 130 to reduce pole tip protrusion. Heat dissipation is enhanced by forming the heat sink layer 134 out of a material, such as copper, that has a high coefficient of thermal conductivity. It is important to note, therefore, that good electrical conductivity is not a requirement of the heat sink layer 134, except it is advantageous in the embodiment shown in FIG. 6 in which the heat sink layer 170 is in electrical communication with the coil 130. Further, it is desirable that the heat sink layer 134 extend laterally (in a direction that is within the plane of the heat sink layer 134 and parallel to the terminus surface) within the spatial constraints of the write element 102, so that excess heat is dissipated through more of the body of the head 100 (FIG. 3). Thus, the aspect ratio (ratio of width to height) of the heat sink layers 170 (FIG. 6), 190 (FIG. 7) is preferably on the order of 20 to 30 or more.

An embodiment of the invention allows a zero throat height to be set according to either the position of the zero throat insulation layer 138 (FIG. 3) or the bottom pole pedestal 126 (FIG. 3). The zero throat height is a dimension defined as a distance, measured from the terminus surface, to a parallel plane (zero throat plane) beyond which the write gap begins to widen. For clarity, this dimension is not called out in FIG. 3, but is instead shown in FIG. 9, described below. From FIG. 3 it can be seen that the write gap has a uniform thickness, defined by the thickness of the write gap layer 114, between the bottom pole pedestal 126 and the high moment layer 128 only until a leading edge of the zero throat insulation layer 138 is reached. Thereafter, the write gap begins to widen into a cavity within the yoke 112 that contains the coil 130 and heat sink layer 134. In FIG. 3, a plane parallel to the terminus surface that intersects the front-most point of the leading edge of the zero throat insulation layer 138 is the zero throat plane, and the distance between the zero throat plane and the terminus surface is the zero throat height.

Figure 9:
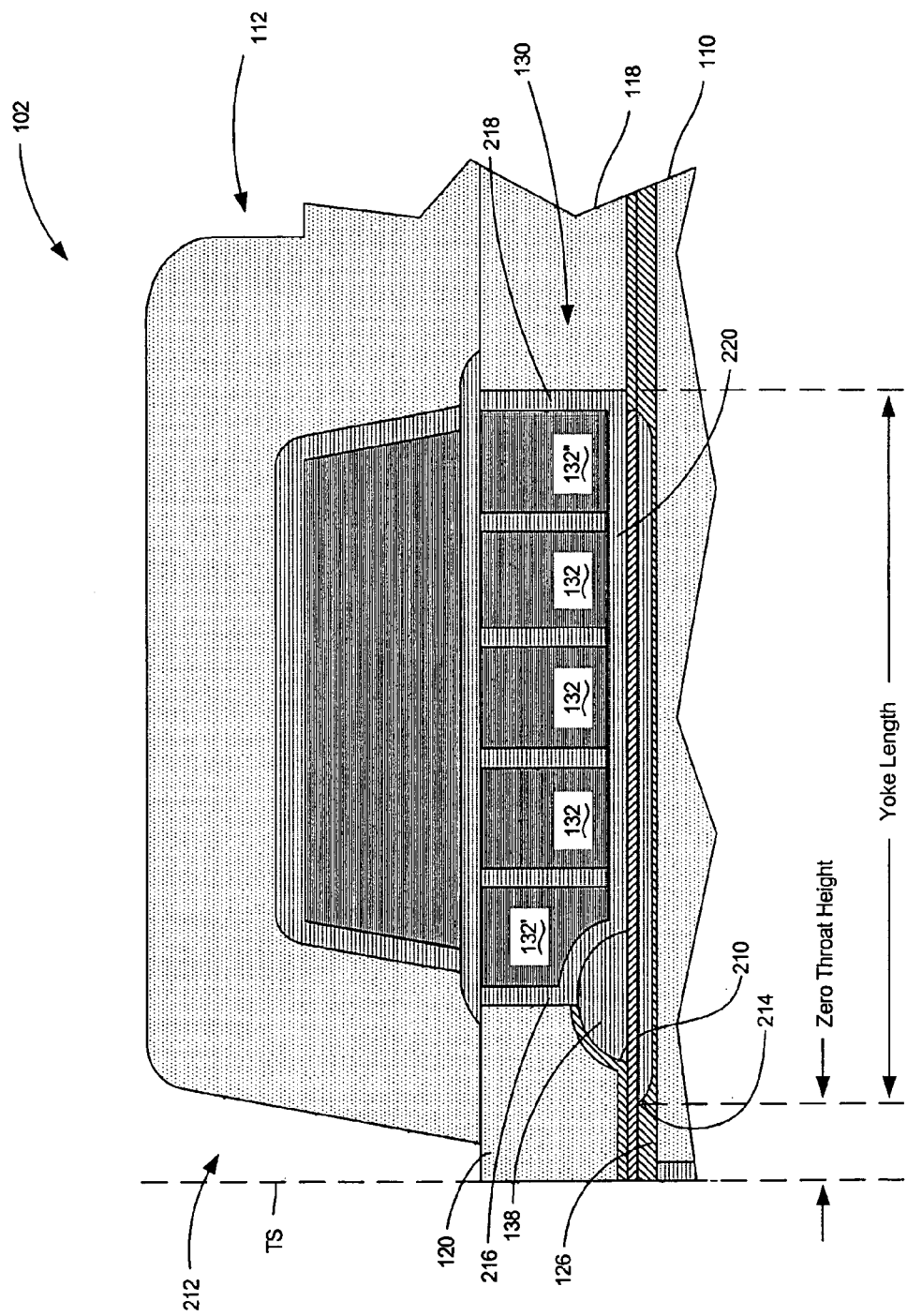
FIG. 9 is a cross-sectional view of a portion of an exemplary write element according to another embodiment of the invention.

While the zero throat height in FIG. 3 is defined by the leading edge 210 (FIG. 9) of the zero throat insulation layer 138, in the exemplary embodiment of a write element 212 shown in FIG. 9, the zero throat height is defined by a trailing edge 214 of the bottom pole pedestal 126. It will be appreciated that in some embodiments the leading edge 210 of the zero throat insulation layer 138 and the trailing edge 214 of the bottom pole pedestal 126 are aligned such that the zero throat height is defined by both.

An embodiment of the invention, also illustrated by FIG. 9, has a shortened yoke length made possible by reducing the spacing between the coil turns 132 and the P2 pole 120 and P2 backgap 118. The yoke length is defined as the distance from the zero throat plane to the front of the P2 backgap 118, as shown. The shortened yoke length shortens the magnetic path around the yoke 112 thereby increasing the frequency at which the write element 102 can operate. More particularly, shortening the length of the magnetic path around the yoke 112 reduces the length of time required to reverse a polarity of a magnetic field within the yoke 112 and therefore increases the number of times the polarity can be reversed in a unit of time.

An embodiment of the invention reduces the spacing between the coil turns 132 and the P2 pole 120 and P2 backgap 118 by insulating the P2 pole 120 from a first turn 132' by a thin first inorganic layer 216, and by insulating the P2 backgap 118 from a last turn 132" by a thin second inorganic layer 218. In some embodiments the first and second inorganic layers 216 and 218 each have a thickness of less than 1.0 μm, and in some of these embodiments the first and second inorganic layers 216 and 218 each have a thickness in the range of 0.2 μm to 0.5 μm. Further, in some embodiments, the first and second inorganic layers 216 and 218 are portions of a lower coil insulation layer 220 additionally disposed between the coil 130 and the bottom pole 110.

It can be seen from FIG. 9 that the zero throat insulation layer 138 is disposed between the bottom pole 110 and the first inorganic layer 216 such that the first inorganic layer 216 includes a portion that follows the contour of the zero throat insulation layer 138 and the first turn 132' at least partially overlies the zero throat insulation layer 138. Although some prior art write elements include a zero throat insulation layer to define the zero throat height, none of these prior art devices include a thin inorganic insulation layer between a P2 pole and a first coil turn because of the difficulty in forming the first coil turn at least partially over the zero throat insulation layer. Accordingly, the prior art devices that have included the zero throat insulation layer have also included a thick organic insulation layer, such as baked photoresist, disposed between a P2 pole and a first coil turn. By replacing the thick organic insulation layer of the prior art with the thin first inorganic layer 216 provided by an embodiment of the invention, the first turn 132' can be placed closer to the P2 pole 120, thus reducing the yoke length.

Embodiments of the invention can also provide methods for fabricating a write element with a reduced yoke length, illustrated in FIGS. 10-18 by cross-sectional views of a partially fabricated write element at successive steps of an exemplary embodiment of the method. An embodiment of the method comprises forming a base layer including a bottom pole and a zero throat insulation layer disposed over the bottom pole, and forming a cover insulation layer over the base layer. An embodiment of the method further comprises forming an anti-reflective coating (ARC) layer over the cover layer and forming a mask layer, including a spiral coil opening, over the ARC layer. During subsequent photolithography steps intended to create a mask for plating a coil, the ARC layer suppresses undesirable reflections off of certain features of the partially fabricated device, such as the zero throat insulation layer, to allow portions of the mask layer to be formed near or on such features. An embodiment of the method further comprises forming a coil layer comprising coil turns within the coil opening, removing the mask layer to form a spiral coil insulation opening, forming a coil insulation layer within the spiral coil insulation opening, and forming a top layer over the coil layer.

Figure 10:
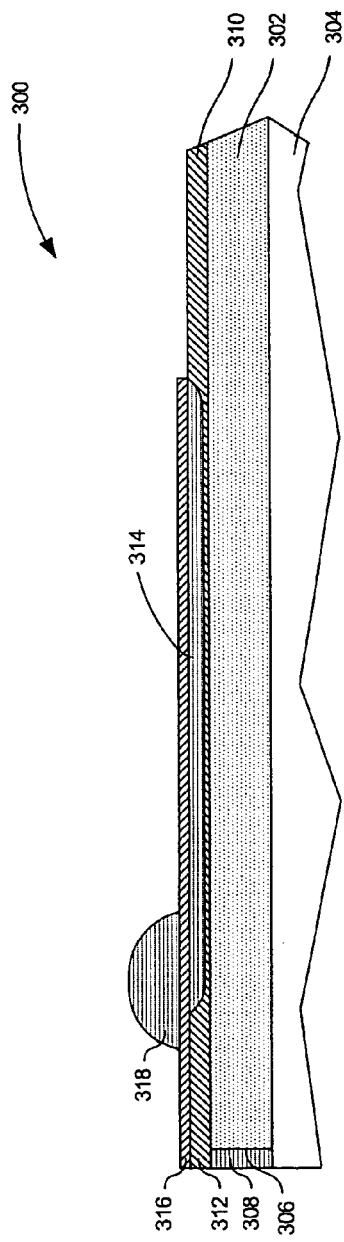
Figure 11:
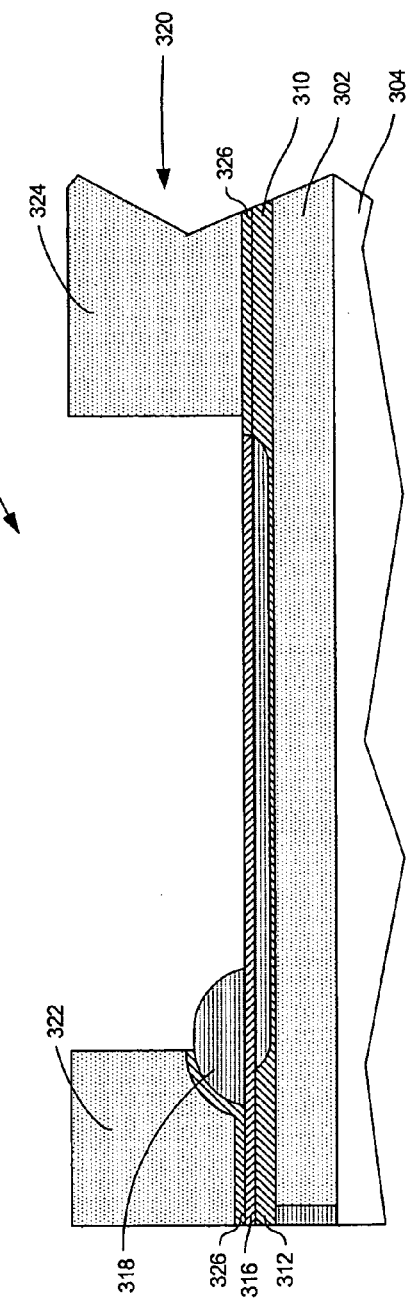

As shown in FIG. 10, forming a base layer 300 includes forming a bottom pole 302 over a substrate 304. The substrate 304 can be any suitably flat support layer, such as a polished silicon wafer. The substrate 304 can also comprise the layers of a read element, such as those layers of the read element 104 that are disposed beneath the bottom pole 110 in FIG. 3.

The bottom pole 302 can be formed of a high magnetic moment material such as most nickel-iron alloys and cobalt-nickel-iron alloys. The bottom pole 302 can be formed, for example, by plating. In some embodiments the bottom pole 302 is formed to provide for a recessed TS face 306 and a TS insulation layer 308. This can be achieved, for instance, by masking so that the bottom pole 302 is not plated within the area that will be filled by the TS insulation layer 308. After the bottom pole 302 is formed, a layer of a protective material, such as alumina ($Al_2O_3$), is deposited, for example, by sputtering, to create the TS insulation layer 308.

In some embodiments, forming the base layer 300 also includes forming a hot seed layer 310 over the bottom pole 302. The hot seed layer 310 is preferably formed of a high moment magnetic material with a higher magnetic moment than the bottom pole 302. Examples of such higher magnetic moment materials include $Ni_{45}Fe_{55}$ and iron nitride compounds such as FeN, FeRhN, and FeTaN. These materials can also be deposited by masking and sputtering. A bottom pole pedestal 312 is optionally formed from the hot seed layer 310, for instance, by masking an area that will become the bottom pole pedestal 312 and etching a remaining exposed area. The hot seed layer 310 in the etched area can be partially etched, as shown in FIG. 10, or completely removed to expose the bottom pole 302. The etching can also be extended into the bottom pole 302 in some embodiments.

In those embodiments that include forming the bottom pole pedestal 312, the etched area behind the bottom pole pedestal 312 is filled with a dielectric material, such as $Al_2O_3$, to form a bottom pole insulation layer 314. The bottom pole insulation layer 314 can be formed, for example, by sputtering a layer of $Al_2O_3$ to a depth that exceeds the height of the bottom pole pedestal 312 followed by a planarization process such as chemical-mechanical polishing (CMP).

Forming the base layer 300 can also comprise forming a write gap layer 316. The write gap layer 316 can also be formed by masking and sputtering and can be formed from a number of suitable low magnetic saturation materials including NiNb, NiCr, and $Al_2O_3$. Although the write gap layer 316 is shown in FIG. 10 as extending to completely cover the bottom pole insulation layer 314, it will be appreciated that the write gap layer 316 need not extend nearly so far. Other configurations for the write gap layer 316 will be discussed in more detail below.

Forming the base layer 300 can also comprise forming a zero throat insulation layer 318 disposed over the bottom pole 302. The zero throat insulation layer 318 can be formed by masking followed by sputtering an insulating material such as $Al_2O_3$. Alternately, the zero throat insulation layer 318 can be formed from cured photoresist through a photolithography process. In those embodiments that include the hot seed layer 310, the zero throat insulation layer 318 can be formed over the bottom pole pedestal 312 or over the bottom pole insulation layer 314, or partially over both, as illustrated in FIG. 10. In some embodiments the write gap layer 316 extends between the zero throat insulation layer 318 and the bottom pole 302. In some embodiments the zero throat insulation layer 318 is formed before the write gap layer 316 and then the write gap layer 316 is deposited. In these embodiments, the write gap layer 316 can optionally cover the zero throat insulation layer 318. In some embodiments the write gap layer 316 extends only as far as the zero throat insulation layer 318. In these embodiments either the write gap layer 316 or the zero throat insulation layer 318 can be formed first.

Forming the base layer 300 can also comprise forming a P2 layer 320 including a P2 pole 322 and a P2 backgap 324. Like the bottom pole 302, the P2 layer 320 can be formed of a high magnetic moment material such as a NiFe or CoNiFe alloy by masking and plating. In some embodiments, forming the base layer 300 also includes forming a high moment layer 326 between the P2 pole 322 and the write gap layer 316. The high moment layer 326 can additionally be formed between the P2 pole 322 and the zero throat insulation layer 318, and between the P2 backgap 324 and the bottom pole 302. The high moment layer 326 is similar to the hot seed layer 310 and preferably formed of a high moment magnetic material with a higher magnetic moment than the material of the P2 layer 320. The high moment layer 326 is likewise preferably deposited by masking and sputtering. In some embodiments, the high moment layer 326 and the hot seed layer 310 are made from the same material. In those embodiments that include the high moment layer 326, the high moment layer 326 is formed before the P2 layer 320.

An embodiment of the method of the invention also comprises forming a cover insulation layer 330 over the base layer 300, as shown in FIG. 12. The cover insulation layer 330 will become the lower coil insulation layer 220 (FIG. 9) that includes the first and second inorganic layers 216 and 218 (FIG. 9) in the completed write element. The cover insulation layer 330 can be formed from an inorganic material, such as $Al_2O_3$, for example, by sputtering. It can be seen in the embodiment of FIG. 12 that the cover insulation layer 330 blankets the top surfaces of the base layer 330.

In order to keep the spacing between the P2 pole 322 and the first turn 132' (FIG. 9), and the spacing between the P2 backgap 324 and the last turn 132" (FIG. 9), both to a practical minimum in order to reduce the yoke length (FIG. 9), the cover insulation layer 330 should be kept very thin. In some embodiments, the cover insulation layer 330 is formed to a thickness, t, of less than 1.00 µm. Accordingly, the first and second inorganic layers 216 and 218 (FIG. 9) can each be made to have a thickness of less than 1.0 µm. Further, because the cover insulation layer 330 tends to be deposited with a reduced thickness on vertical surfaces compared to horizontal surfaces, the first and second inorganic layers 216 and 218 can each have a thickness in the range of about 0.2 µm to about 0.5 µm.

As also shown in FIG. 12, an embodiment of the method of the invention can also comprise forming a seed layer 332 and an anti-reflective coating (ARC) layer 334 over the cover layer 330. The seed layer 332 is a very thin layer of an electrically conductive material such as copper. The seed layer 332 serves as an electrode during the subsequent plating of a coil layer 342, discussed below with respect to FIG. 15.

The ARC layer 334 is formed over the cover layer 330 and particularly over an exposed portion of the zero throat insulation layer 318, the importance of which is described in detail below with respect to FIG. 13. In those embodiments that include the seed layer 332, the ARC layer 334 is formed over the seed layer 332. Forming the ARC layer 334, in some embodiments, includes depositing a silicon nitride compound such as $SiN_x$ or $SiON_x$. The ARC layer 334 is preferably deposited to a thickness of about 80 Å to about 200 Å, and more preferably to a thickness of about 160 Å.

As shown in FIG. 13, a method of an embodiment of the invention also comprises forming a mask layer 336, including a spiral coil opening 338, over the ARC layer 334. The mask layer 336 can be formed by standard photolithographic processes including spin coating undeveloped photoresist over the ARC layer 334, exposing the photoresist to a patterned illumination, developing the photoresist, and removing undeveloped photoresist to leave the mask layer 336. It will be appreciated that the ARC layer 334 allows portions of the mask layer 336, such as mask portion 340, to be formed either on, or near (as illustrated in FIG. 13) the zero throat insulation layer 318.

More specifically, without the ARC layer 334, during the photolithography step that exposes the photoresist to the patterned illumination, light reflected off of the curved surface of the zero throat insulation layer 318 can be reflected into portions of the photoresist that are not intended to be exposed. Accordingly, these portions are not developed during the developing photolithography step and are subsequently removed. Thus, without the ARC layer 334, the curvature of the zero throat insulation layer 318 prevents the formation of photoresist features on or near the zero throat insulation layer 318. It is the ability to form the mask portion 340 on or near the zero throat insulation layer 318 that allows the first turn 132' (FIG. 9) to be formed between the mask portion 340 and the P2 pole 322. It should be noted that reflections off of the zero throat insulation layer 318 are not the only reflections that can cause problems with forming the mask layer 336. Accordingly, the ARC layer 334 is additionally beneficial for suppressing reflections off of the vertical sidewalls of the P2 pole 322 and the P2 backgap 324.

Figure 14:
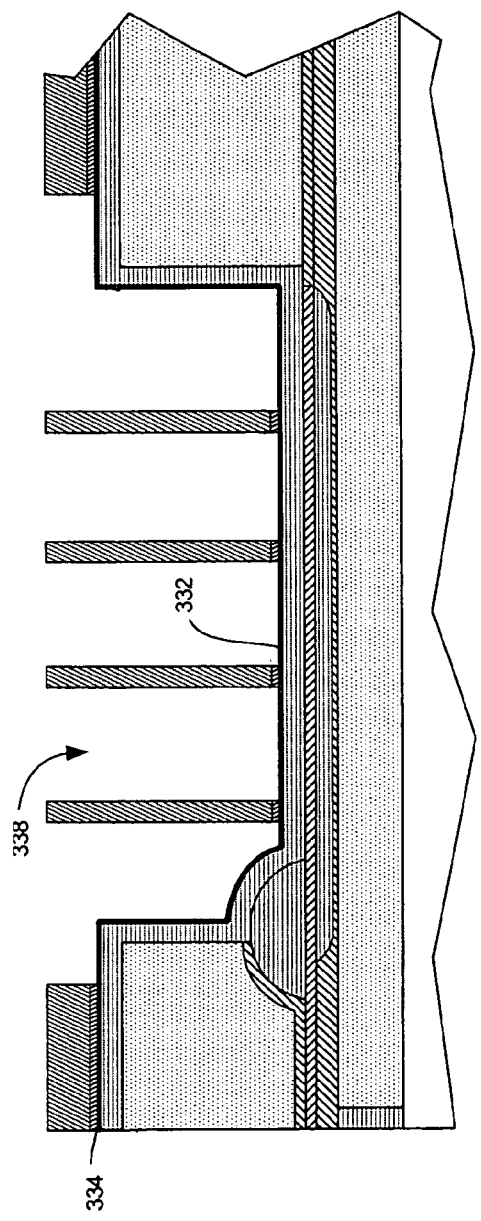
Figure 15:
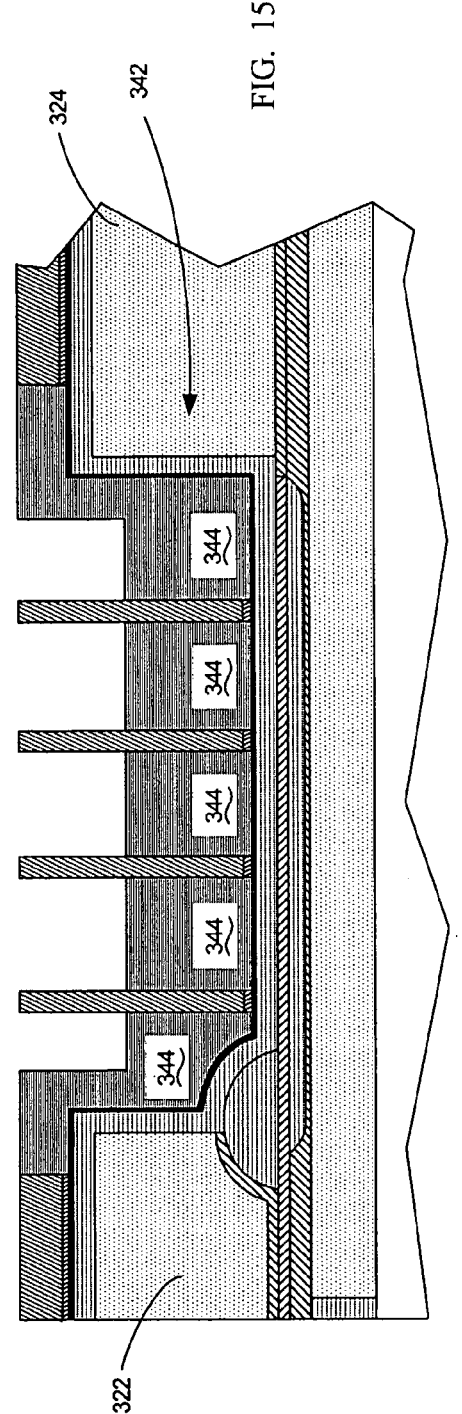

An embodiment of the method of the invention also comprises forming the coil layer 342 (FIG. 15) comprising coil turns 344 (FIG. 15). As shown in FIG. 14, forming the coil layer 342 can include selectively removing the ARC layer 334 where exposed by the spiral coil opening 338. Selectively removing the ARC layer 334 exposes the seed layer 332 for subsequently plating the coil layer 342. The ARC layer 334 can be removed, for example, by reactive ion etching (RIE).

Forming the coil layer 342 by plating is illustrated in FIG. 15. The coil layer 342 is preferably formed from a highly conductive material such as copper. In some embodiments, as shown, the plating extends over the P2 pole 322 and the P2 backgap 324. It will be appreciated that the coil layer 342 can also be formed by other methods, such as sputtering, though plating is a preferred technique because it can deposit a relatively thick layer comparatively quickly. The seed layer 332 provides an electrode that allows the coil layer 342 to be plated, as noted above, however in some embodiments that do not form the coil layer 342 by plating the seed layer 332 is not necessary.

Figure 16:
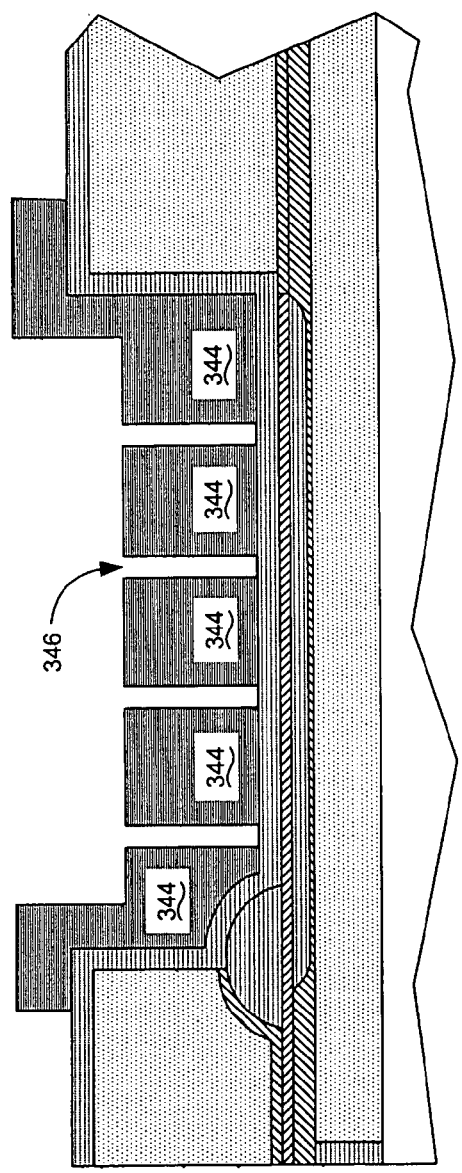

Some embodiments of the invention further comprise forming a spiral coil insulation opening 346 between the coil turns 344 by removing the mask layer 336, as shown in FIG. 16. Forming the spiral coil insulation opening 346 also includes removing the ARC layer 334 (FIG. 15) where exposed by the removal of the mask layer 336, and removing the seed layer 332 (FIG. 15) where exposed by the removal of the ARC layer 334. The mask layer 336 can be removed, for example, by wet chemical stripping as commonly used in photolithography processes. The ARC layer 334 can be removed, for example, by RIE. The seed layer 332 can be removed, for instance, by ion milling. In FIG. 16, and subsequent drawings, the seed layer 332 beneath the coil turns 344 is omitted as the seed layer 332 becomes part of the coil turns 344 as the coil turns 344 are plated.

Figure 17:
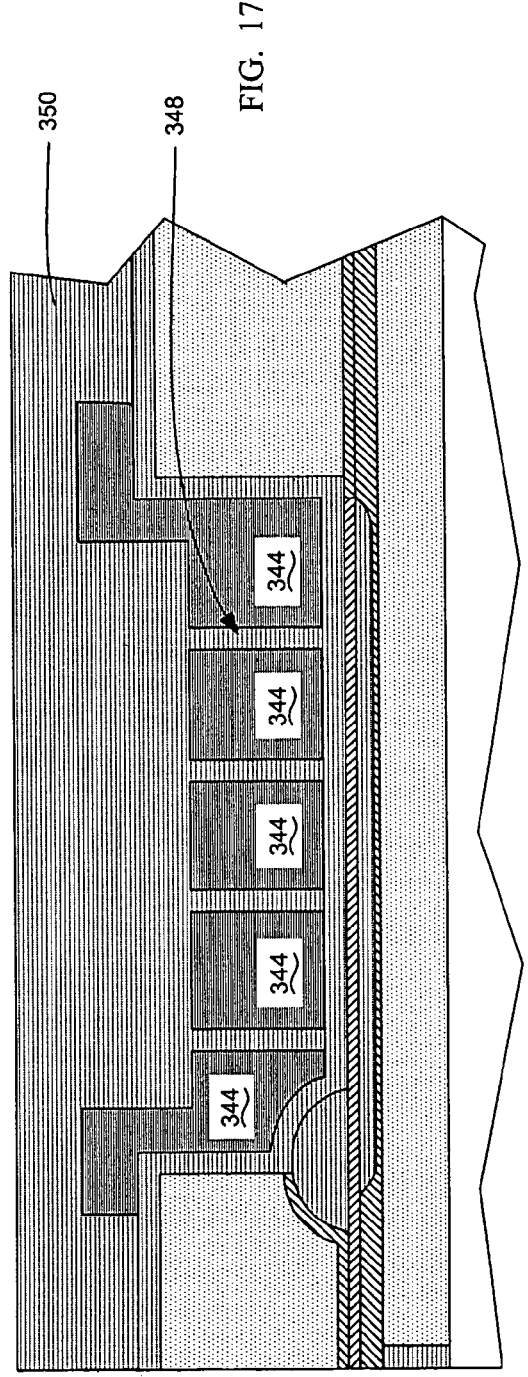

Some embodiments of the invention further comprise forming a spiral coil insulation layer 348 within the spiral coil insulation opening 346 and between the coil turns 344, as shown in FIG. 17. Forming the spiral coil insulation layer 348 can be achieved, for example, by depositing a blanket layer 350 of a dielectric material such as $Al_2O_3$. Forming the spiral coil insulation layer 348 can be completed by planarizing to remove excess materials and produce a planar surface 352 upon which further layers can be formed. The planar surface 352 exposes the P2 pole 322 and the P2 backgap 324 so that a P3 layer (top pole 116 in FIG. 3) can be joined thereto. CMP is one method of planarizing to form the planar surface 352. It will be appreciated that the level of the planar surface 352 is one of the parameters that can vary between embodiments. For example, by continuing the planarization to produce a lower planar surface 352 than the one shown in FIG. 18 would produce a structure more similar to the one shown in FIG. 3.

Figure 18:
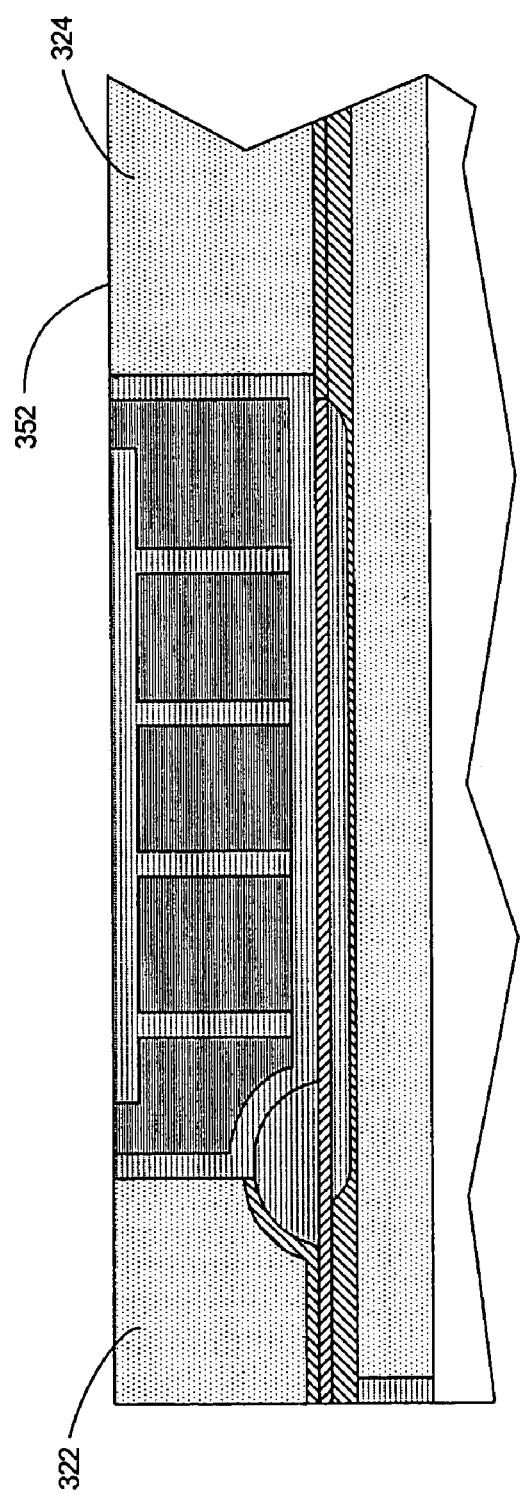

Some embodiments of the invention further comprise forming a top layer over the coil layer 342 (FIG. 15). More specifically, the top layer is formed on the planar surface 352 (FIG. 18). In some embodiments the top layer comprises a relatively flat P3 layer joined to the P2 pole 322 and P2 backgap 324, and an insulation layer, such as upper coil insulation layer 202 (FIG. 8), disposed between the coil layer 342 and the P3 layer. In other embodiments the P3 layer is substantially as shown as top pole 116 (FIG. 3) so as to also include either a heat sink layer 134 (FIG. 3) or a second coil layer. The techniques to form the further layers of the top layer is much as described above.

It should be noted that in those embodiments of the method wherein forming the top layer includes forming the heat sink layer 134 (FIG. 3) or, alternately, the second coil layer mentioned above, a height of the heat sink layer 134 or the second coil layer is a design criteria that can be varied to alter an efficiency of the write element. Here, efficiency is a measure of the strength of the write field 162 (FIG. 5) for a given amount of electrical current input to the coil 130 (FIG. 3) compared with a theoretical maximum strength. The height of the heat sink layer 134 or the second coil layer effects the length of the over-all magnetic path around the yoke 112 (FIG. 3) and an over-all separation between the bottom and top poles 110, 116 (FIG. 3). While efficiency is increased by further separation between the bottom and top poles 110, 116, efficiency is reduced by the increased magnetic path length caused by increased separation. It will be appreciated that efficiency is optimized for different embodiments of the write element of the invention at different over-all separations between the bottom and top poles 110, 116. The optimized separation can be achieved, in some embodiments, by selecting an optimized height of the heat sink layer 134 or the second coil layer once the thicknesses of the other layers of the write element have been specified.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A write element with a reduced yoke length, the write element comprising:
 a bottom pole;
 a top pole;

a P2 layer disposed between the bottom and top poles and including
  a P2 pole, and
  a P2 backgap providing magnetic communication between the bottom and top poles;
    a coil having turns disposed between the P2 pole and the P2 backgap, the turns including
    a first turn insulated from the P2 pole by a first inorganic layer, and
    a last turn insulated from the P2 backgap by a second inorganic layer; and
a zero throat insulation layer disposed between the bottom pole and the first inorganic layer, the first turn at least partially over the zero throat insulation layer.

2. The write element of claim 1 wherein the first and second inorganic layers are formed of $Al_2O_3$.

3. The write element of claim 1 wherein the first and second inorganic layers are portions of a coil insulation layer additionally disposed between the coil and the bottom pole.

4. The write element of claim 3 wherein the first and second inorganic layers each have a thickness of less than 1.0 μm.

5. The write element of claim 3 wherein the first and second inorganic layers each have a thickness in the range of 0.2 μm to 0.5 μm.

6. The write element of claim 3 wherein the first and second inorganic layers each have a thickness of about 0.2 μm.

7. The write element of claim 1 further comprising a write gap layer disposed between the P2 pole and the bottom pole.

8. The write element of claim 7 wherein the write gap layer extends between the zero throat insulation layer and the bottom pole.

9. The write element of claim 1 further comprising a bottom pole pedestal disposed between the P2 pole and the bottom pole.

10. The write element of claim 1 wherein the bottom pole includes a recessed face.

11. The write element of claim 1 further comprising a heat sink layer including less than two complete turns around a backgap portion of the top pole, the heat sink layer in electrical communication with the coil and disposed between the coil and the top pole.

12. The write element of claim 11 further comprising
  a P3 insulation layer between the top pole and the heat sink layer, and
  a coil insulation layer between the coil and the heat sink layer,
  wherein the heat sink layer fills a volume defined between the P3 insulation layer and the coil insulation layer.

13. The write element of claim 11 wherein a ratio of a width of the heat sink layer measured under the top pole to a width of at least one of the coil turns measured under the top pole is at least 10.

14. The write element of claim 1 further comprising a heat sink layer disposed between the coil and the top pole and electrically isolated from the coil.

15. The write element of claim 14 further comprising
  a P3 insulation layer between the top pole and the heat sink layer, and
  a coil insulation layer between the coil and the heat sink layer,
  wherein the heat sink layer fills a volume defined between the P3 insulation layer and the coil insulation layer.

16. The write element of claim 14 wherein a ratio of a width of the heat sink layer measured under the top pole to a width of at least one of the coil turns measured under the top pole is at least 10.

17. The write element of claim 1 further comprising
  a write gap layer disposed between the P2 pole and the bottom pole;
  a bottom pole pedestal disposed between bottom pole and the write gap layer and including a trailing edge; and
  a zero throat insulation layer disposed between the write gap layer and the top pole and including a leading edge.

18. The write element of claim 17 wherein the trailing edge of the bottom pole pedestal defines a zero throat height.

19. The write element of claim 17 wherein the leading edge of the zero throat insulation layer defines a zero throat height.

20. The write element of claim 17 wherein the leading edge of the zero throat insulation layer is aligned with the trailing edge of the bottom pole pedestal.

* * * * *